(12) United States Patent
Cao et al.

(10) Patent No.: US 12,455,396 B1
(45) Date of Patent: Oct. 28, 2025

(54) METHOD FOR ASSESSING STABILITY OF ROADWAY SURROUNDING ROCK BASED ON NUMERICAL SIMULATION AND DEEP LEARNING

(71) Applicant: China University of Mining and Technology, Xuzhou (CN)

(72) Inventors: Anye Cao, Xuzhou (CN); Geng Li, Xuzhou (CN); Chengchun Xue, Xuzhou (CN); Yaoqi Liu, Xuzhou (CN); Fan Chen, Xuzhou (CN); Changbin Wang, Xuzhou (CN); Xu Yang, Xuzhou (CN); Guowei Lyu, Xuzhou (CN); Xianxi Bai, Xuzhou (CN); Yujie Peng, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 0 days.

(21) Appl. No.: 19/082,263

(22) Filed: Mar. 18, 2025

(30) Foreign Application Priority Data

Apr. 26, 2024 (CN) .......................... 202410512693.6

(51) Int. Cl.
*G01V 20/00* (2024.01)
(52) U.S. Cl.
CPC .................... *G01V 20/00* (2024.01)
(58) Field of Classification Search
None
See application file for complete search history.

(56) References Cited

U.S. PATENT DOCUMENTS

| 8,190,414 B2 * | 5/2012 | Huang | E21B 49/00 |
| | | | 703/10 |
| 2018/0113235 A1 * | 4/2018 | Laverne | G01V 20/00 |
| 2019/0243017 A1 * | 8/2019 | Klinger | G01V 1/301 |

FOREIGN PATENT DOCUMENTS

| CN | 107357966 A | * | 11/2017 | ............ G06F 30/20 |
| CN | 115929406 B | * | 8/2023 | |

OTHER PUBLICATIONS

Zhu J, Yang L, Wang X, Zheng H, Gu M, Li S, Fang X. Risk Assessment of Deep Coal and Gas Outbursts Based on IQPSO-SVM. Int J Environ Res Public Health. Oct. 8, 2022; 19(19): 12869. doi: 10.3390/ijerph191912869. PMID: 36232168; PMCID: PMC9564896 (Year: 2022).*

(Continued)

*Primary Examiner* — Lina Cordero
(74) *Attorney, Agent, or Firm* — Hemisphere Law, PLLC; Zhigang Ma

(57) ABSTRACT

A stability assessment method of roadway surrounding rock includes: obtaining actual stratum rock parameters; establishing a two-dimensional geological model through numerical simulation based on a drill core columnar diagram and the actual stratum rock parameters; changing influencing factors, and recording amounts and acceleration values of deformation of roadway sidewalls, and whether failure occurs to obtain dynamic response characteristics of roadway surrounding rock, combining the changed influencing factors and the dynamic response characteristics as labels to obtain a dataset, and obtaining multiple datasets including the dataset; dividing the multiple datasets into a training set and a validation set, inputting the training set into a PSO-BP neural network and a GA-SVM deep learning model to obtain a preliminary stability assessment model, and adjusting and validating the preliminary stability assessment model by the validation set to obtain an optimized stability (Continued)

assessment model; and using the optimized stability assessment model to assess roadway stability.

7 Claims, 9 Drawing Sheets

(56) References Cited

OTHER PUBLICATIONS

Garci-a-Gonzalo E, Fernandez-Muniz Z, Garci-a Nieto PJ, Bernardo Sanchez A, Menendez Fernandez M. Hard-Rock Stability Analysis for Span Design in Entry-Type Excavations with Learning Classifiers. Materials. 2016; 9(7):531. https://doi.org/10.3390/ma9070531 (Year: 2016).*

China University of Mining and Technology and Shanxi Changwuting South Coal Industry Co., Ltd (Applicants), Claims (allowed) of CN202410512693.6, Apr. 26, 2024.

CNIPA, Notification to grant patent right for invention in CN202410512693.6, Jan. 3, 2025.

* cited by examiner

METHOD FOR ASSESSING STABILITY OF ROADWAY SURROUNDING ROCK BASED ON NUMERICAL SIMULATION AND DEEP LEARNING

CROSS-REFERENCE TO RELATED APPLICATION

This application claims priority to Chinese Patent Application No. 202410512693.6, filed on Apr. 26, 2024, which is herein incorporated by reference in its entirety.

TECHNICAL FIELD

The disclosure relates to the field of safety prediction and evaluation technologies for mining roadway surrounding rock, and more particularly to a method for assessing stability of the roadway surrounding rock based on numerical simulation and deep learning.

BACKGROUND

With the increase in mining depth and the deterioration of resource conditions in coal mines in China, safety accidents caused by instability of roadway surrounding rock have become increasingly serious. The stability assessment of the roadway surrounding rock is a crucial aspect in mine safety production. The purpose of the stability assessment is to timely identify potential risks of the instability of the roadway surrounding rock and take corresponding preventive measures promptly, so as to avoid or reduce the occurrence of safety accidents. However, there are still some problems with the stability assessment of the roadway surrounding rock. At present, most assessment methods are based on empirical formulas and theoretical calculations, while these methods often fail to comprehensively consider the complexity and variability of the roadway surrounding rock. For example, factors such as the lithology, structure, stress state, and groundwater conditions of the roadway surrounding rock may affect its stability, and these factors are often difficult to accurately quantify and consider in practical assessment. At the same time, since theoretical models are often overly simplified, current theoretical research results are often difficult to be directly applied to actual engineering, thus failing to fully reflect complex situations in the actual engineering. Moreover, for the stability assessment of the roadway surrounding rock in rockburst-prone mines, the relevant theoretical research on support against rockburst and pressure relief measures still lags behind engineering practice.

Therefore, there is an urgent need to develop a method that can accurately and quickly assess the stability of roadways to effectively ensure the safe production of mines.

SUMMARY

In response to above problems in the related art, the disclosure provides a method for assessing stability of roadway surrounding rock based on numerical simulation and deep learning. The method is highly flexible and widely applicable, and enables rapid and accurate assessment of the stability of the roadway surrounding rock under the same geological conditions with different dynamic loads, support and pressure-relief measures. Moreover, the method can be adjusted and optimized according to actual circumstances.

In order to achieve above purposes, the disclosure provides the method for assessing the stability of the roadway surrounding rock based on the numerical simulation and the deep learning. The method includes the following steps:

step 1: determining a roadway to be assessed in an underground coal mine, collecting rocks from a roof of the underground coal mine as samples, and performing physical and mechanical property tests on the samples with laboratory equipment to obtain actual stratum rock parameters under an actual geological environment;

step 2: establishing a two-dimensional geological model through the numerical simulation based on a drill core columnar diagram (also referred to as core log) corresponding to drilling holes near the roadway to be assessed and the actual stratum rock parameters obtained from the physical and mechanical property tests;

step 3: changing influencing factors in the two-dimensional geological model, and then recording amounts of deformation of sidewalls of a roadway in the two-dimensional geological model, acceleration values of the deformation of the sidewalls of the roadway and whether failure occurs in the roadway to thereby obtain dynamic response characteristics of a surrounding rock of the roadway, taking the changed influencing factors and the dynamic response characteristics of the surrounding rock of the roadway as labels, combining the changed influencing factors and the dynamic response characteristics of the surrounding rock of the roadway to obtain a dataset, obtaining multiple datasets including the dataset, and forming a database with the multiple datasets, where the influencing factors include dynamic load intensity, a dynamic load action distance, dynamic load action time, a static load stress level, a support parameter, and a pressure-relief measure;

step 4: dividing the multiple datasets into a training set and a validation set according to a set ratio, inputting the training set into a particle swarm optimization (PSO)-back propagation (BP) neural network and a genetic algorithm (GA)-support vector machine (SVM) deep learning model for the deep learning to obtain a preliminary roadway surrounding rock stability assessment model based on the numerical simulation and the deep learning, and adjusting and validating the preliminary roadway surrounding rock stability assessment model by using the validation set to obtain an optimized roadway surrounding rock stability assessment model; and step 5: using the optimized roadway surrounding rock stability assessment model to assess stability of other mining stages of the roadway to be assessed, and determining whether surrounding rock of the roadway to be assessed will become unstable or fail under a target geological condition, a target support method, and a target pressure-relief measure when subjected to dynamic loads.

In an embodiment, the method further includes: when determining that the surrounding rock of the roadway to be assessed will become unstable or fail under the target geological condition, the target support method, and the target pressure-relief measure when subjected to the dynamic loads, taking measures such as designing and establishing an anti-impact support to enhance anti-impact strength of the roadway surrounding rock.

In an embodiment, the method further includes: when determining that the surrounding rock of the roadway to be assessed will become unstable or fail under the target geological condition, the target support method and the target pressure-relief measure when subjected to the dynamic loads, sending, by a processor, a warning message to a mobile device of a working personnel in the roadway to be assessed to alert the working personnel to evacuate the roadway to be assessed, thereby ensuring safety productions in the underground coal mine, where the mobile device includes a processor, a memory and a display, the memory and the display are electrically connected to the processor, the warning message is sent to the processor of the mobile device, and the processor of the mobile device controls the display to show the warning message.

In an embodiment, to fully reflect mechanical behavior of the coal rock mass, in the step 1, the actual stratum rock parameters include: a density, bulk modulus, shear modulus, a friction angle, and cohesive force.

In an embodiment, in the step 2, a universal distinct element code (UDEC) numerical simulation software is used to establish the two-dimensional geological model.

In an embodiment, to establish a two-dimensional geological model that accurately reflects the deformation and response characteristics of surrounding rock of the roadway under different working conditions, in the step 2, the establishing a two-dimensional geological model includes the following steps:

S21: determining boundary conditions of the two-dimensional geological model, including: setting horizontal displacements in x and y directions to zero, fixing a lower boundary of the two-dimensional geological model by setting a displacement at the lower boundary to zero, and setting an upper boundary of the two-dimensional geological model as a free boundary subjected to equivalent loading; selecting a Mohr-Coulomb yield criterion; establishing the two-dimensional geological model based on the drill core columnar diagram with no considering plastic flow and dilatancy; and assigning the actual stratum rock parameters obtained in the step 1 to the two-dimensional geological model;

S22: applying loads to a top and two sides of the two-dimensional geological model according to an actual burial depth and crustal stress measurement results, where the load applied to the top of the two-dimensional geological model is a self-weight load (also referred to as dead load), the self-weight load is calculated by using an equation (1) expressed as follows, the loads applied to the two sides of the two-dimensional geological model are calculated based on the crustal stress measurement results, and calculation of the loads to the top and the two sides of the two-dimensional geological model is performed under given mechanical conditions and displacement boundary conditions to thereby make the two-dimensional geological model from an initial state to an initial stress equilibrium state, where the equation (1) is as follows:

$$P=\gamma H; \quad (1)$$

where P represents the self-weight load, $\gamma$ represents an average unit weight of strata, with a value of 25 kilonewton per cubic meter ($kN/m^3$), and H represents a height from the upper boundary to a ground surface, with a unit being meters (m); and S23: using a crack command in the UDEC numerical simulation software to divide the two-dimensional geological model into five layers, where the five layers include four layers as the roof being siltstone, argillaceous siltstone, siltstone and mudstone, and a layer of coal seam, and the roadway is arranged within the coal seam.

In an embodiment, to obtain the multiple datasets conveniently and quickly, in the step 3, the obtaining multiple datasets including the dataset includes:

arranging the roadway in the two-dimensional geological model, arranging measurement lines on the sidewalls of the roadway and a bottom of the roadway, monitoring the amounts of the deformation of the sidewalls of the roadway and the acceleration values of the deformation of the sidewalls of the roadway and whether the failure occurs in the roadway under one time of the changing influencing factors to thereby obtain the dynamic response characteristics of the surrounding rock of the roadway, taking the changed influencing factors and the dynamic response characteristics of the surrounding rock of the roadway as the labels, combining the changed influencing factors and the dynamic response characteristics of the surrounding rock of the roadway to obtain the dataset, establishing multiple numerical simulation models (i.e., two-dimensional geological models) under different times of the changing influencing factors and obtaining the multiple datasets according to above steps.

In an embodiment, in order to obtain a model that can quickly and accurately assess the stability of the roadway surrounding rock, in the step 4, the optimized roadway surrounding rock stability assessment model is established as follows:

S41, shuffling randomly an order of the multiple datasets in the database by using a Randperm function in a matrix laboratory (MATLAB) software, and then dividing the multiple datasets into the training set and the validation set according to the set ratio of 7:3;

S42, establishing the PSO-BP neural network, including:

S421, determining a topology structure and a number of nodes of a BP neural network;

S422, setting initial parameters of a PSO algorithm, and optimizing initial weights and thresholds of the BP neural network, where the initial parameters include: learning factors, a number of training iterations, a target error, a learning rate, a population update frequency, a population size, and position and velocity limits of particles;

S423, determining a root mean square error (RMSE) function as a performance evaluation function of the BP neural network;

S424, determining an individual optimal solution and a global optimal solution in the PSO algorithm;

S425, updating each of the particles according to an equation (2) as follows:

$$\begin{cases} v_d^{j+1} = v_d^j + c_1 \times rand() \times (pbest_d^i - x_d^j) + c_2 \times rand() \times (gbest_d^i - x_d^j) \\ x_d^{j+1} = x_d^j + v_d^{j+1} \end{cases} \quad (2)$$

where i=1, 2 to N, N represents a total number of the particles, $v_d^i$ represents a velocity vector of a particle i of the particles in dimension d, rand( ) represents a random number between 0 and $x_d^i$ represents a position vector of the particle i of the particles in the dimension d, and $c_1$ and $c_2$ are learning factors, with $c_1=c_2=2$;

S426, when a number of iterations in the PSO algorithm reaches the number of training iterations or the target error is met, ending an iterative optimization process of the PSO algorithm; when the number of iterations in the PSO algorithm does not reach the number of training iterations and the target error is not met, returning to the step S423 for further optimization;

S427, substituting optimized weights and optimized thresholds obtained at the ending an iterative optimization process of the PSO algorithm as optimal output values into the BP neural network for data training to achieve effective, accurate, and rapid data fitting;

S43, establishing the GA-SVM deep learning model, including:

S431, setting initial parameters of an SVM, including a kernel function K (x, z) and an appropriate penalty parameter C;

S432, setting initial parameters of a GA, and optimizing the initial parameters of the SVM;

S433, determining the RMSE function as an evaluation function of the SVM;

S434, when a number of iterations in the GA reaches a preset number of training iterations or a preset target error is met, ending an iterative optimization process of the GA; when the preset number of iterations in the GA does not reach the number of training iterations and the preset target error is not met, returning to the step S432 for further optimization;

S435, substituting optimized parameters c and g obtained at the ending the iterative optimization process of the GA as optimal output values of the GA into the SVM for data training to achieve effective, accurate, and rapid data fitting;

S44, establishing the preliminary roadway surrounding rock stability assessment model, including:

S441, in a PSO-BP neural network model, using vertical stress, horizontal stress, a dynamic load intensity, a dynamic load distance, a sidewall bolt length, a base corner bolt length, and a base corner bolt angle in the multiple datasets as assessment indicators, using a maximum sidewall displacement and a maximum sidewall velocity in the multiple datasets as target values, inputting the training set and the validation set into the PSO-BP neural network model, and refining the preliminary roadway surrounding rock stability assessment model by using a PSO-BP algorithm; and S442, in a GA-SVM model, using the maximum sidewall displacement and the maximum sidewall velocity in the multiple datasets as assessment indicators, using a result corresponding to whether the failure occurs in the roadway as a target value, inputting the training set and the validation set into the GA-SVM model, and refining the preliminary roadway surrounding rock stability assessment model by using a GA-SVM algorithm.

In an embodiment, in the step 5, the using the optimized roadway surrounding rock stability assessment model to assess stability of other mining stages of the roadway to be assessed includes:

inputting specific parameters of the dynamic load intensity, the dynamic load action distance, the dynamic load action time, the static load stress level, the support parameter and the pressure-relief measure into the optimized roadway surrounding rock stability assessment model, and determining, by the optimized roadway surrounding rock stability assessment model, whether the surrounding rock of the roadway to be assessed will become unstable or fail under the specific parameters through data prediction.

The disclosure is based on the numerical simulation, the deep learning, and field measurement data. First, the impact of various influencing factors on the stability of the roadway surrounding rock, such as the dynamic load intensity, the dynamic load distance, the dynamic load action time, the static load stress level, the support parameter and the pressure-relief measure, is analyzed through the numerical simulation, the dynamic response characteristics of the surrounding rock of the roadway are recorded, and the stability of the roadway surrounding rock under different working conditions can be conveniently and comprehensively determined through the data prediction. Then, in the deep learning, based on results of the numerical simulation, a nonlinear relationship between the influencing factors and the dynamic response characteristics of the surrounding rock of the roadway is determined, thereby building an assessment model that allows for a quick assessment of the stability of the roadway surrounding rock. Finally, the assessment model is refined and perfected by using field data, which can significantly improve the accuracy of the assessment model.

The disclosure constructs an accurate, objective, rational, and reliable stability assessment model for the roadway surrounding rock, overcoming challenges of traditional assessment methods, which are labor-intensive, time-consuming, costly, and unable to conduct large-scale or comprehensive field measurements. The method has advantages of being accurate, objective, rational, and reliable in predicting the stability grade of the roadway surrounding rock and assessing model maturity, with a high degree of consistency with actual conditions. The method aids in the scientific design of anti-impact support and support methods for roadways, effectively enhancing the anti-impact strength of the roadway surrounding rock, thereby significantly reducing the extent and scope of impact damage. The disclosure is of great significance for protecting the safety of personnel working in the mining space, improving operational safety, and ensuring the safe production of mines. The method is highly flexible and widely applicable, enabling rapid and accurate assessments of the stability of the roadway surrounding rock under the same geological conditions while with different dynamic loads, support method and pressure-relief measures. The method can also be adjusted and optimized according to actual conditions.

DETAILED DESCRIPTION OF EMBODIMENTS

Figure 1:
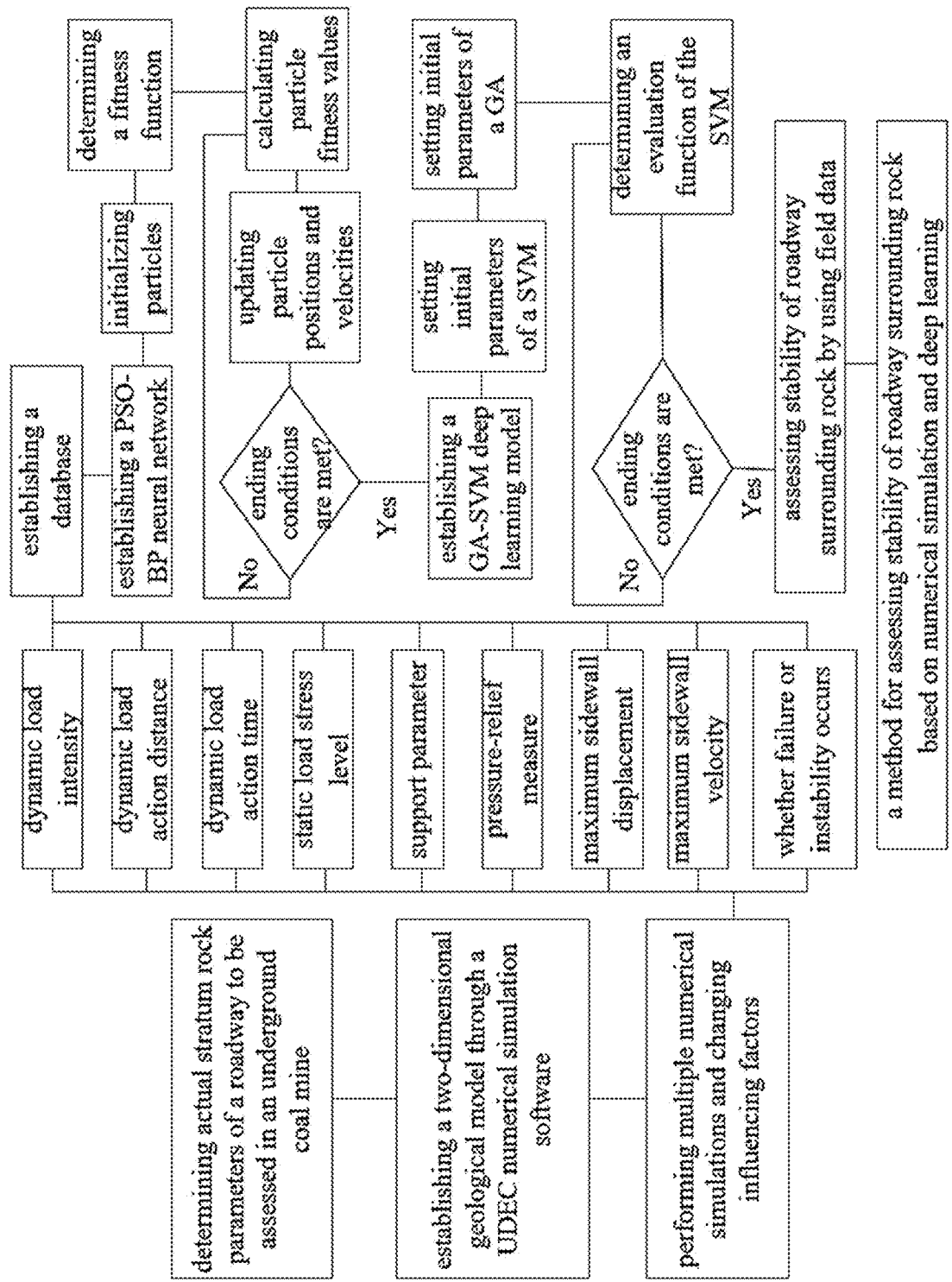
FIG. 1 illustrates a flowchart of a method for assessing stability of roadway surrounding rock of the disclosure.
Figure 2:
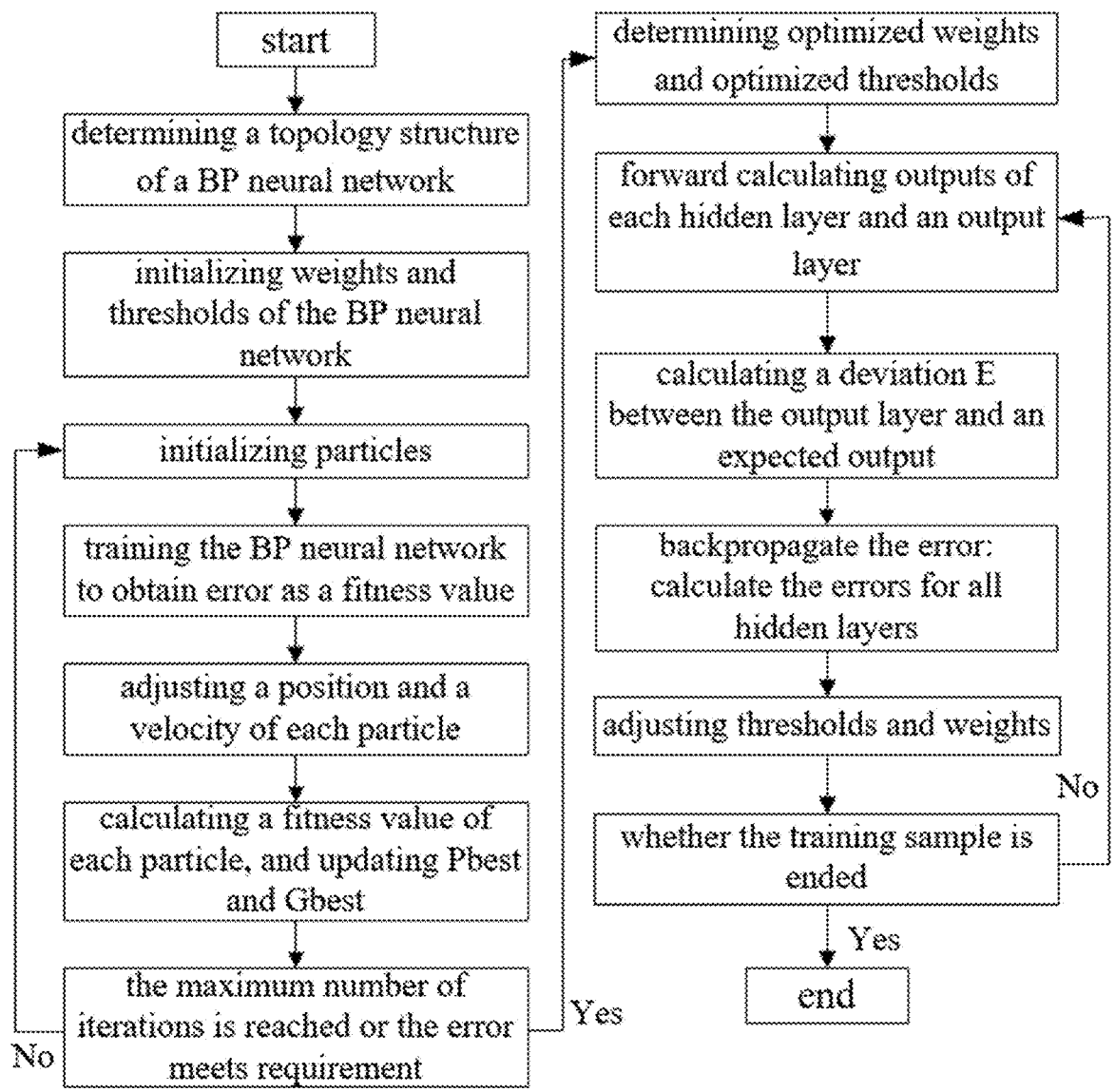
FIG. 2 illustrates a flowchart of a PSO-BP neural network model of the disclosure.
Figure 3:
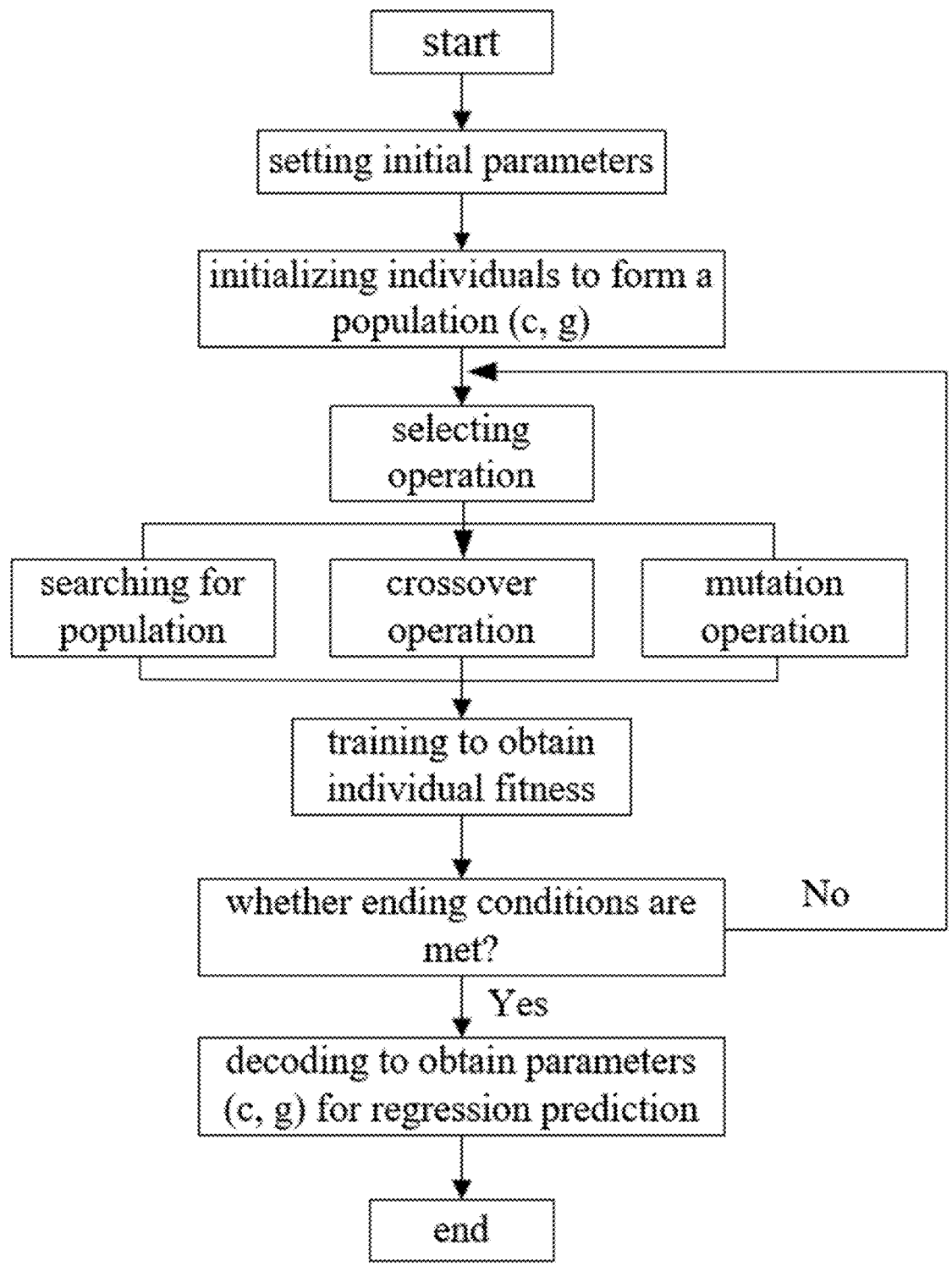
FIG. 3 illustrates a flowchart of a GA-SVM of the disclosure.

As shown in FIG. 1 to FIG. 10, the disclosure provides a method for assessing stability of roadway surrounding rock based on numerical simulation and deep learning. To provide a detailed explanation of the disclosure, data from a coal mine work-plane roadway is selected for illustrative purposes. The method includes the following steps 1-5.

Step 1: a roadway to be assessed in an underground coal mine is determined, rocks are collected from a roof of the underground coal mine as samples, and physical and mechanical property tests are performed on the samples with laboratory equipment to obtain actual stratum rock parameters under an actual geological environment. In order to fully reflect mechanical behavior of the coal rock mass, the actual stratum rock parameters include: a density, bulk modulus, shear modulus, a friction angle, and cohesive force. Specific mechanical parameters of the coal rock mass are shown in table 1.

TABLE 1 mechanical parameters of the coal rock mass

| Rock layer name | Density/ (kg/m³) | Bulk modulus/ GPa | Shear modulus/ GPa | Elastic modulus/ GPa | Poisson ratio | Thickness/ m |
|---|---|---|---|---|---|---|
| Siltstone | 2600 | 5.6 | 4.2 | 10.08 | 0.2 | 10 |
| Argillaceous siltstone | 2560 | 5 | 3.8 | 9.1 | 0.2 | 6.4 |
| Siltstone | 2600 | 5.6 | 4.2 | 10.08 | 0.2 | 9.6 |
| Mudstone | 2540 | 3.5 | 1.3 | 3.47 | 0.33 | 4 |
| Coal seam | 1490 | 3.0 | 0.7 | 1.95 | 0.39 | 10 |

Step 2: a two-dimensional geological model is established through the numerical simulation based on a drill core columnar diagram corresponding to drilling holes near the roadway to be assessed and the actual stratum rock parameters obtained from the physical and mechanical property tests.

In order to establish a two-dimensional geological model that accurately reflects the deformation and response characteristics of roadway surrounding rock under different working conditions, a UDEC numerical simulation software is used to establish the two-dimensional geological model, and a process of establishing a two-dimensional geological model includes following steps S21-S23.

S21: boundary conditions of the two-dimensional geological model are determined as follows: horizontal displacements in x and y directions are set to zero, a lower boundary of the two-dimensional geological model is fixed by setting a displacement at the lower boundary to zero, and an upper boundary of the two-dimensional geological model is set as a free boundary subjected to equivalent loading; a Mohr-Coulomb yield criterion is selected as a yield criterion; the two-dimensional geological model is established based on the drill core columnar diagram with no considering plastic flow and dilatancy; and the actual stratum rock parameters obtained in the step 1 are assigned to the two-dimensional geological model.

S22: loads are applied to a top and two sides of the two-dimensional geological model according to an actual burial depth and crustal stress measurement results, where the load applied to the top of the two-dimensional geological model is a self-weight load, the self-weight load is calculated through an equation (1), the loads applied to the two sides of the two-dimensional geological model are calculated based on the crustal stress measurement results, and under given mechanical conditions and displacement boundary conditions, calculation of the loads applied to the top and the two sides of the two-dimensional geological model is performed to make the two-dimensional geological model from an initial state to an initial stress equilibrium state, where the equation (1) is as follows:

$$P=\gamma H; \qquad (1)$$

Where P represents the self-weight load, $\gamma$ represents an average unit weight of strata, with a value of 25 KN/m³, and H represents a height from the upper boundary to a ground surface, with a unit being m.

In the embodiment, the coal mine used has a burial depth of 536 m, hence the value of H is taken as 536 m. The self-weight load P applied to the top of the two-dimensional geological model is calculated as P=$\gamma$H=25×536=13.4 megapascals (MPa), with a direction being a z-axis direction. The loads applied to the two sides of the two-dimensional geological model are $\theta_1$=16.1 MPa, with a direction being an x-axis direction, and $\sigma_2$=15.5 MPa, with a direction being a y-axis direction.

Figure 4:
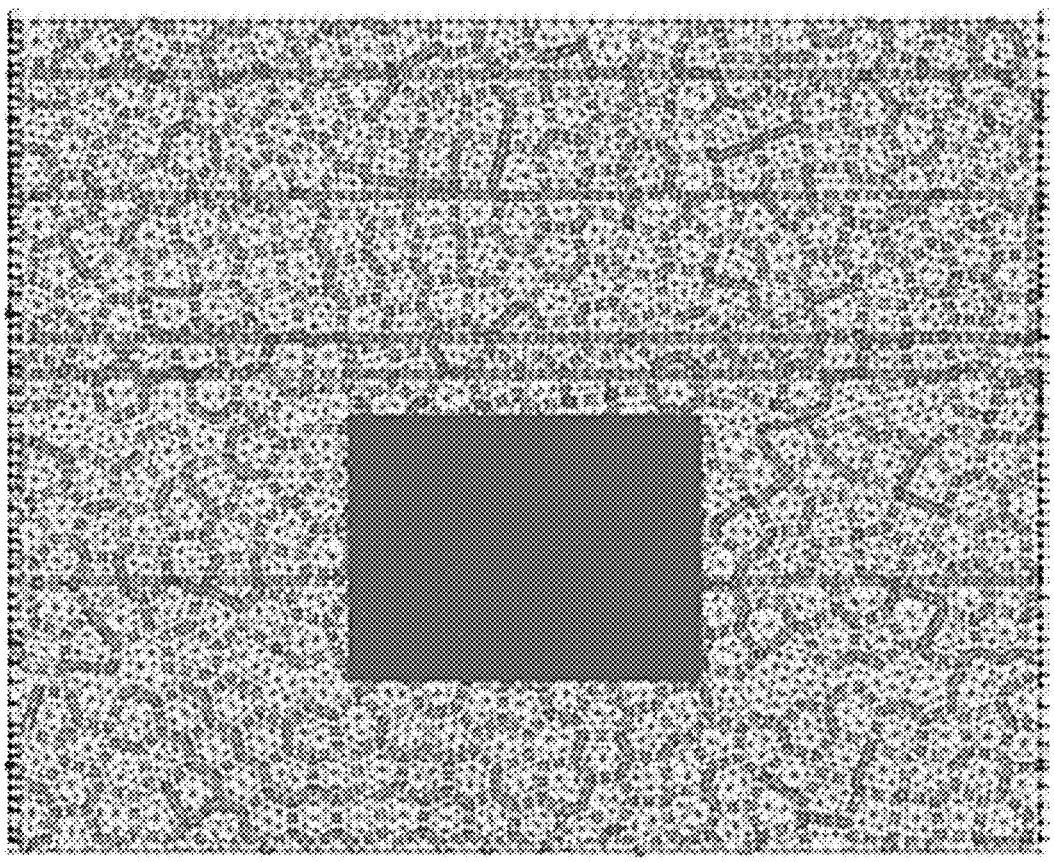
FIG. 4 illustrates a schematic diagram of block division in a UDEC model of the disclosure.
Figure 5:
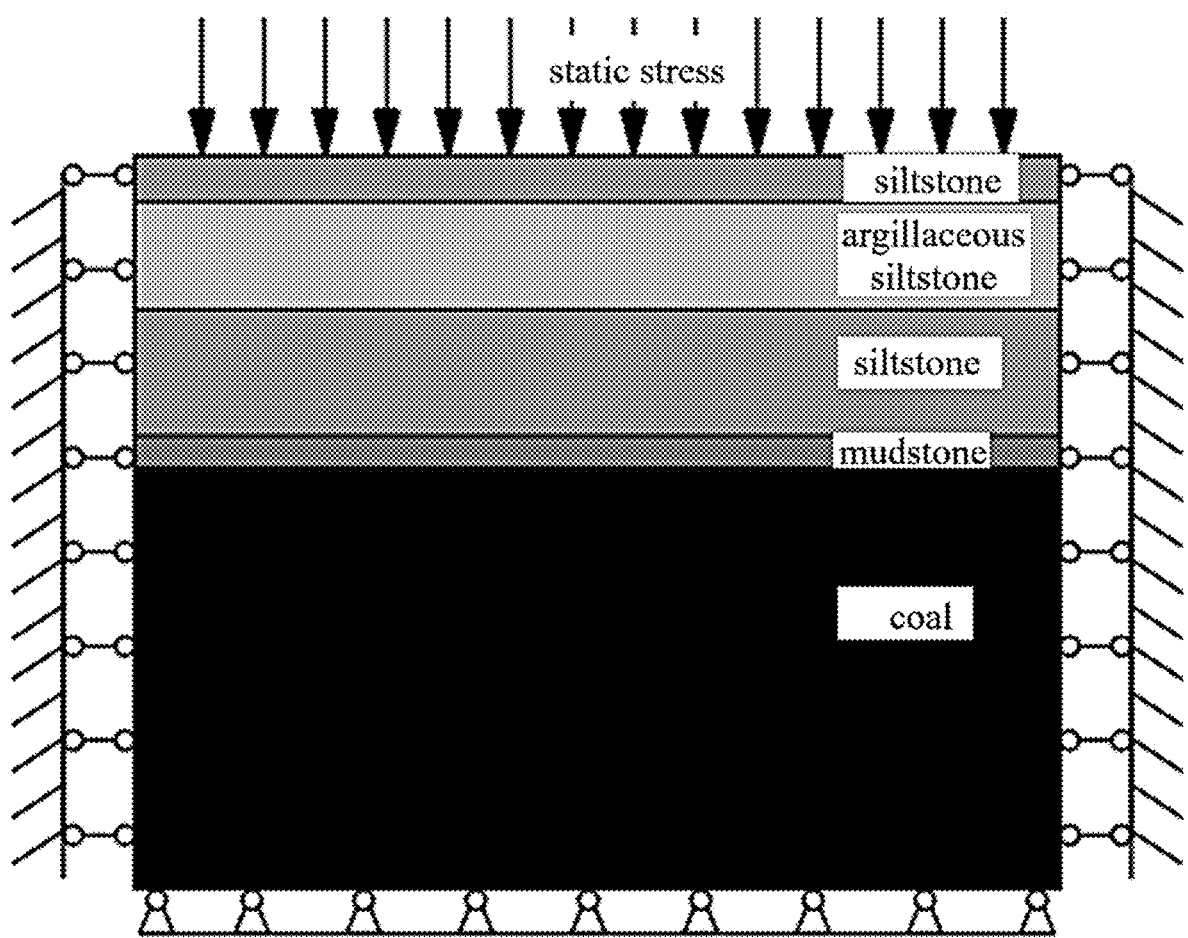
FIG. 5 illustrates a schematic diagram of a computational model of the disclosure.

S23: a crack command in the UDEC numerical simulation software is used to divide the two-dimensional geological model into five layers, where the five layers include four layers as the roof being siltstone, argillaceous siltstone, siltstone and mudstone, and a layer of coal seam, and a roadway is arranged within the coal seam. Referring to FIG. 4, the numerical simulation model (i.e., the two-dimensional geological model) has an overall height of 60 m and a width of 40 m, and the roadway which is simulated has a height of 3.6 m and a width of 5.4 m. To investigate the deformation and response characteristics of the roadway surrounding rock under combined dynamic and static loading conditions, a specific area of 16 m in height and 20 m in width near the roadway in the numerical simulation model is divided into triangular blocks of 0.6 m. Other areas of the numerical simulation model use irregular blocks of 1 m.

Step 3: influencing factors are changed in the two-dimensional geological model, and then amounts of deformation of sidewalls of the roadway, acceleration values of the deformation of the sidewalls of the roadway and whether failure occurs in the roadway are recorded to obtain dynamic response characteristics of surrounding rock of the roadway, the changed influencing factors and the dynamic response characteristics of the surrounding rock of the roadway are taken as labels and are combined to obtain a dataset, multiple datasets including the dataset are obtained, and a database is formed with the multiple datasets, where the influencing factors include dynamic load intensity, a dynamic load action distance, dynamic load action time, a static load stress level, a support parameter, and a pressure-relief measure.

In order to obtain the multiple datasets conveniently and quickly, the multiple datasets are obtained as follows: arranging the roadway in the two-dimensional geological model, arranging measurement lines on the sidewalls of the roadway and a bottom of the roadway, monitoring the amounts of the deformation, the acceleration values of the deformation of the sidewalls of the roadway and whether the failure occurs in the roadway under one time of the changing influencing factors to obtain the dynamic response characteristics of the surrounding rock of the roadway, taking the changed influencing factors and the dynamic response characteristics of the surrounding rock of the roadway as the labels, combining the changed influencing factors and the dynamic response characteristics of the surrounding rock of the roadway to obtain the dataset, establishing multiple numerical simulation models (i.e., multiple two-dimensional geological models) under different times of the changing influencing factors, and obtaining the multiple datasets according to above steps.

In the embodiment, the number of the multiple datasets are 66, as shown in table 2.

TABLE 2

Statistical table of assessment indicators and target values

| Number | Vertical stress/ MPa | Horizontal stress/ MPa | Dynamic load intensity/ MPa | Sidewall bolt length/ m | Dynamic load distance/ m | Base corner bolt angle/ ° | Base corner bolt length/ m | Maximum sidewall displacement/ m | Maximum sidewall velocity/ $m^{-s}$ | Whether failure or instability occur on roadway |
|---|---|---|---|---|---|---|---|---|---|---|
| 1 | 1.34 | 0.96 | 1.00 | 2.80 | 3.00 | 1.00 | 4.30 | 0.04 | 1.00 | 0 |
| 2 | 1.34 | 0.96 | 5.00 | 2.80 | 3.00 | 1.00 | 4.30 | 0.04 | 3.00 | 0 |
| 3 | 1.34 | 0.96 | 6.00 | 2.80 | 3.00 | 1.00 | 4.30 | 0.59 | 3.85 | 1 |
| 4 | 1.34 | 0.96 | 7.00 | 2.80 | 3.00 | 1.00 | 4.30 | 0.06 | 4.45 | 0 |
| 5 | 1.34 | 0.96 | 9.00 | 2.80 | 3.00 | 1.00 | 4.30 | 0.705 | 6 | 1 |
| 6 | 1.34 | 0.96 | 8.00 | 2.80 | 3.00 | 1.00 | 4.30 | 0.07 | 5.00 | 0 |
| 7 | 1.34 | 0.96 | 10.00 | 2.80 | 3.00 | 1.00 | 4.30 | 0.82 | 9.00 | 1 |
| 8 | 1.34 | 0.96 | 5.00 | 2.80 | 3.00 | 1.00 | 2.80 | 0.06 | 3.14 | 0 |
| 9 | 1.34 | 0.96 | 6.00 | 2.80 | 3.00 | 1.00 | 2.80 | 0.06 | 3.80 | 0 |
| 10 | 1.34 | 0.96 | 7.00 | 2.80 | 3.00 | 1.00 | 2.80 | 0.43 | 4.70 | 1 |
| 11 | 1.34 | 0.96 | 8.00 | 2.80 | 3.00 | 1.00 | 2.80 | 0.59 | 5.90 | 1 |
| 12 | 1.34 | 0.96 | 9.00 | 2.80 | 3.00 | 1.00 | 2.80 | 0.71 | 6.00 | 0 |
| 13 | 1.34 | 0.96 | 5.00 | 2.80 | 2.00 | 1.00 | 4.30 | 0.05 | 2.85 | 0 |
| 14 | 1.34 | 0.96 | 6.00 | 2.80 | 2.00 | 1.00 | 4.30 | 0.06 | 3.40 | 0 |
| 15 | 1.34 | 0.96 | 7.00 | 2.80 | 2.00 | 1.00 | 4.30 | 0.43 | 5.75 | 1 |
| 16 | 1.34 | 0.96 | 8.00 | 2.80 | 2.00 | 1.00 | 4.30 | 0.60 | 6.20 | 1 |
| 17 | 1.34 | 0.96 | 5.00 | 2.80 | 2.00 | 1.00 | 2.80 | 0.05 | 2.82 | 0 |
| 18 | 1.34 | 0.96 | 6.00 | 2.80 | 2.00 | 1.00 | 2.80 | 0.06 | 3.40 | 0 |
| 19 | 1.34 | 0.96 | 7.00 | 2.80 | 2.00 | 1.00 | 2.80 | 0.24 | 3.95 | 1 |
| 20 | 1.34 | 0.96 | 3.00 | 2.80 | 1.00 | 1.00 | 4.30 | 0.05 | 2.62 | 0 |
| 21 | 1.34 | 0.96 | 4.00 | 2.80 | 1.00 | 1.00 | 4.30 | 0.08 | 4.20 | 0 |
| 22 | 1.34 | 0.96 | 5.00 | 2.80 | 1.00 | 1.00 | 4.30 | 0.33 | 5.50 | 1 |
| 23 | 1.34 | 0.96 | 3.00 | 2.80 | 1.00 | 1.00 | 2.80 | 0.05 | 2.63 | 0 |
| 24 | 1.34 | 0.96 | 4.00 | 2.80 | 1.00 | 1.00 | 2.80 | 0.09 | 4.70 | 0 |
| 25 | 1.34 | 0.96 | 5.00 | 2.80 | 1.00 | 1.00 | 2.80 | 0.36 | 4.95 | 1 |
| 26 | 1.34 | 0.96 | 5.00 | 2.80 | 3.00 | 1.00 | 4.30 | 0.08 | 3.10 | 0 |
| 27 | 2.01 | 0.96 | 4.00 | 2.80 | 3.00 | 1.00 | 4.30 | 0.07 | 2.45 | 0 |
| 28 | 2.01 | 0.96 | 5.00 | 2.80 | 3.00 | 1.00 | 4.30 | 0.08 | 3.10 | 0 |
| 29 | 2.01 | 0.96 | 6.00 | 2.80 | 3.00 | 1.00 | 4.30 | 0.08 | 3.66 | 0 |
| 30 | 2.01 | 0.96 | 7.00 | 2.80 | 3.00 | 1.00 | 4.30 | 0.08 | 4.29 | 0 |
| 31 | 2.01 | 0.96 | 8.00 | 2.80 | 3.00 | 1.00 | 4.30 | 1.37 | 7.28 | 1 |
| 32 | 2.01 | 0.96 | 9.00 | 2.80 | 3.00 | 1.00 | 4.30 | 1.50 | 9.07 | 1 |
| 33 | 2.01 | 0.96 | 10.00 | 2.80 | 3.00 | 1.00 | 4.30 | 1.81 | 9.60 | 1 |
| 34 | 1.34 | 1.44 | 4.00 | 2.80 | 3.00 | 1.00 | 4.30 | 0.07 | 2.62 | 0 |
| 35 | 1.34 | 1.44 | 5.00 | 2.80 | 3.00 | 1.00 | 4.30 | 0.19 | 3.55 | 1 |
| 36 | 1.34 | 1.44 | 6.00 | 2.80 | 3.00 | 1.00 | 4.30 | 0.08 | 3.67 | 0 |
| 37 | 1.34 | 1.44 | 7.00 | 2.80 | 3.00 | 1.00 | 4.30 | 0.85 | 4.28 | 1 |
| 38 | 1.34 | 1.44 | 8.00 | 2.80 | 3.00 | 1.00 | 4.30 | 1.37 | 7.28 | 1 |
| 39 | 1.34 | 1.44 | 9.00 | 2.80 | 3.00 | 1.00 | 4.30 | 1.50 | 9.06 | 1 |
| 40 | 1.34 | 1.44 | 10.00 | 2.80 | 3.00 | 1.00 | 4.30 | 1.81 | 9.60 | 1 |
| 41 | 1.34 | 0.96 | 7.00 | 2.80 | 3.00 | 1.50 | 2.80 | 0.75 | 7.50 | 1 |
| 42 | 1.34 | 0.96 | 7.00 | 2.80 | 3.00 | 2.00 | 2.80 | 0.25 | 5.00 | 1 |
| 43 | 1.34 | 0.96 | 7.00 | 2.80 | 3.00 | 2.50 | 2.80 | 0.35 | 5.45 | 1 |
| 44 | 1.34 | 0.96 | 7.00 | 2.80 | 3.00 | 3.00 | 2.80 | 0.30 | 5.00 | 1 |
| 45 | 1.34 | 0.96 | 7.00 | 2.80 | 3.00 | 4.50 | 2.80 | 0.20 | 4.00 | 1 |
| 46 | 1.34 | 0.96 | 7.00 | 2.80 | 3.00 | 6.00 | 2.80 | 0.70 | 7.00 | 1 |
| 47 | 1.34 | 0.96 | 7.00 | 2.20 | 3.00 | 1.00 | 2.80 | 0.20 | 5.00 | 1 |
| 48 | 1.34 | 0.96 | 7.00 | 2.40 | 3.00 | 1.00 | 2.80 | 0.22 | 4.80 | 1 |
| 49 | 1.34 | 0.96 | 7.00 | 2.60 | 3.00 | 1.00 | 2.80 | 0.35 | 4.80 | 1 |
| 50 | 1.34 | 0.96 | 7.00 | 3.00 | 3.00 | 1.00 | 2.80 | 0.48 | 7.00 | 1 |
| 51 | 1.34 | 0.96 | 7.00 | 3.20 | 3.00 | 1.00 | 2.80 | 0.30 | 5.00 | 1 |
| 52 | 1.34 | 0.96 | 5.00 | 5.30 | 3.00 | 1.00 | 4.30 | 0.06 | 3.10 | 0 |
| 53 | 1.34 | 0.96 | 6.00 | 5.30 | 3.00 | 1.00 | 4.30 | 0.42 | 5.63 | 1 |
| 54 | 1.34 | 0.96 | 7.00 | 5.30 | 3.00 | 1.00 | 4.30 | 0.25 | 4.40 | 1 |
| 55 | 1.34 | 0.96 | 8.00 | 5.30 | 3.00 | 1.00 | 4.30 | 0.91 | 9.00 | 1 |
| 56 | 1.34 | 0.96 | 10.00 | 5.30 | 3.00 | 1.00 | 4.30 | 2.46 | 12.75 | 1 |
| 57 | 1.34 | 1.05 | 4.00 | 2.80 | 3.00 | 1.00 | 4.30 | 0.05 | 2.52 | 0 |
| 58 | 1.34 | 1.05 | 5.00 | 2.80 | 3.00 | 1.00 | 4.30 | 0.06 | 3.29 | 0 |
| 59 | 1.34 | 1.05 | 6.00 | 2.80 | 3.00 | 1.00 | 4.30 | 0.06 | 3.83 | 0 |
| 60 | 1.34 | 1.05 | 7.00 | 2.80 | 3.00 | 1.00 | 4.30 | 0.62 | 5.39 | 1 |

TABLE 2-continued

Statistical table of assessment indicators and target values

| Number | Vertical stress/ MPa | Horizontal stress/ MPa | Dynamic load intensity/ MPa | Side-wall bolt length/ m | Dynamic load distance/ m | Base corner bolt angle/ ° | Base corner bolt length/ m | Maximum sidewall displace-ment/ m | Maximum sidewall velocity/ m$^{-s}$ | Whether failure or instability occur on roadway |
|---|---|---|---|---|---|---|---|---|---|---|
| 61 | 1.34 | 1.05 | 8.00 | 2.80 | 3.00 | 1.00 | 4.30 | 0.53 | 7.74 | 1 |
| 62 | 1.34 | 1.15 | 4.00 | 2.80 | 3.00 | 1.00 | 4.30 | 0.05 | 2.62 | 0 |
| 63 | 1.34 | 1.15 | 5.00 | 2.80 | 3.00 | 1.00 | 4.30 | 0.06 | 3.22 | 0 |
| 64 | 1.34 | 1.15 | 6.00 | 2.80 | 3.00 | 1.00 | 4.30 | 0.06 | 3.77 | 0 |
| 65 | 1.34 | 1.15 | 7.00 | 2.80 | 3.00 | 1.00 | 4.30 | 0.06 | 4.41 | 0 |
| 66 | 1.34 | 1.15 | 8.00 | 2.80 | 3.00 | 1.00 | 4.30 | 0.25 | 6.38 | 1 |

Step 4: the multiple datasets are divided into a training set and a validation set according to a set ratio, the training set is input into a PSO-BP neural network and a GA-SVM deep learning model for the deep learning to obtain a preliminary roadway surrounding rock stability assessment model based on the numerical simulation and the deep learning, and the preliminary roadway surrounding rock stability assessment model is adjusted and validated by using the validation set to obtain an optimized roadway surrounding rock stability assessment model.

In order to obtain a model that can quickly and accurately assess the stability of the roadway surrounding rock, in the step 4, the optimized roadway surrounding rock stability assessment model is established according to following steps S41-S442.

S41, an order of the multiple datasets (i.e., the 66 groups of datasets in the embodiment) in the database is shuffled randomly by using a Randperm function in a MATLAB software, and then the multiple datasets are divided into the training set and the validation set according to the set ratio of 7:3.

S42, the PSO-BP neural network is established, including the step S421-S427.

S421, a topology structure and a number of nodes of a BP neural network are determined.

S422, initial parameters of a PSO algorithm are set, and initial weights and thresholds of the BP neural network are optimized; where the initial parameters include: learning factors, a number of training iterations, a target error, a learning rate, a population update frequency, a population size, and position and velocity limits of particles.

S423, a performance evaluation function (also referred to as a fitness function) of the BP neural network is determined, and a RMSE function is used to reflect the accuracy of the output data.

S424, an individual optimal solution (also referred to as personal best solution, Pbest) and a global optimal solution (also referred to as global best solution, Gbest) in the PSO algorithm are determined.

S425, each of the particles according to an equation (2) is updated as follows:

$$\begin{cases} v_d^{j+1} = v_d^j + c_1 \times rand() \times (pbest_d^j - x_d^j) + c_2 \times rand() \times (gbest_d^j - x_d^j) \\ x_d^{j+1} = x_d^j + v_d^{j+1} \end{cases} \quad (2)$$

where i=1, 2 to N, N represents a total number of the particles, $v_d^i$ represents a velocity vector of a particle i of the particles in dimension d, rand( ) represents a random number between 0 and 1, $x_d^i$ represents a position vector of the particle i of the particles in the dimension d, and $c_1$ and $c_2$ are learning factors, with $c_1=c_2=2$.

S426, when a number of iterations in the PSO algorithm reaches the number of training iterations or the target error is met, an iterative optimization process of the PSO algorithm is ended; when the number of iterations in the PSO algorithm does not reach the number of training iterations and t the target error is not met, it is returned to the step S423 for further optimization.

S427, optimized weights and optimized thresholds obtained at the end of the iterative optimization process of the PSO algorithm as optimal output values are substituted into the BP neural network for data training to achieve effective, accurate, and rapid data fitting.

S43, the GA-SVM deep learning model is established, including the following steps S431-S435.

S431, initial parameters of an SVM are set, including a kernel function K (x, z) and an appropriate penalty parameter C.

S432, initial parameters of a GA are set, and the initial parameters of the SVM are optimized.

S433, an evaluation function of the SVM is determined, and the mean squared error (MSE) is used to reflect the accuracy of the output data.

S434, when a number of iterations in the GA reaches a preset number of training iterations or a preset target error is met, an iterative optimization process of the GA is ended; when the preset number of iterations in the GA does not reach the number of training iterations and the preset target error is not met, it is returned to the step S432 for further optimization.

S435, optimized parameters c and g obtained at the end of the iterative optimization process of the GA as optimal output values of the GA are substituted into the SVM for data training to achieve effective, accurate, and rapid data fitting.

S44, the preliminary roadway surrounding rock stability assessment model is established, including the following steps S441-S442.

Figure 6:
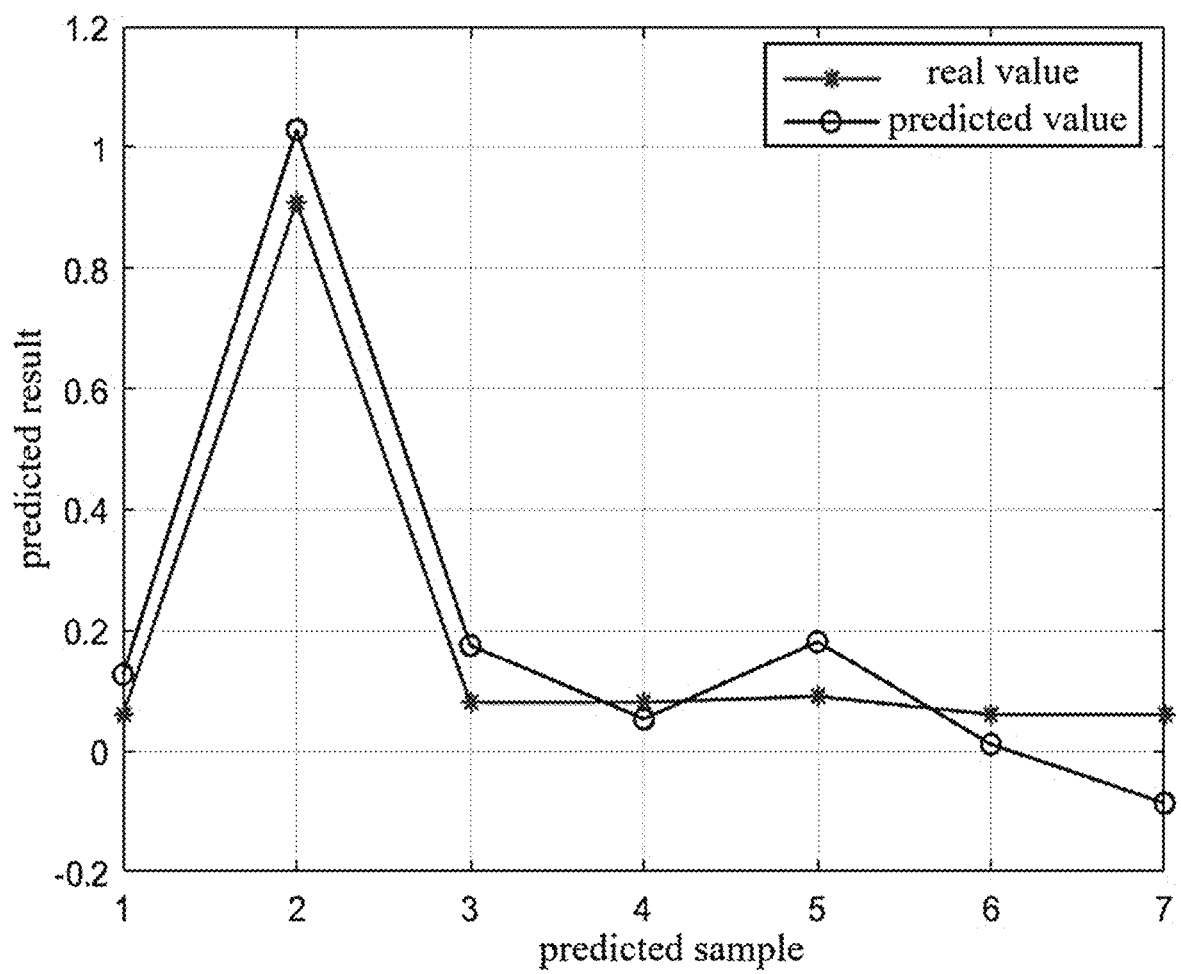
FIG. 6 illustrates a curve comparison diagram between predicted and simulated values of a maximum sidewall displacement in a validation set with PSO-BP of the disclosure.

S441, in a PSO-BP neural network model, vertical stress, horizontal stress, a dynamic load intensity, a dynamic load distance, a sidewall bolt length, a base corner bolt length and a base corner bolt angle in the multiple datasets (i.e., the 66 groups of datasets in the embodiment) are used as assessment indicators, a maximum sidewall displacement and a maximum sidewall velocity in the multiple datasets are used as target values, the training set and the validation set are input into the PSO-BP neural network model, and the preliminary roadway surrounding rock stability assessment model is refined by using a PSO-BP algorithm. The numerical fitting regression prediction results in the validation set are shown in FIG. 6. The generalization ability of the roadway safety assessment model (i.e., the stability assessment model) is assessed using the validation set data. In a test set for the maximum sidewall displacement, R=0.92, and in a test set for the maximum sidewall velocity, R=0.93; where R represents the correlation between predicted values and test values (i.e., simulated values or real values), in a range of 0-1. The larger the value of R, the better the correlation, indicating that the predicted values are closer to the test values in the numerical simulation. A value of R close to 1 indicates that the model has a good fit and high accuracy.

Figure 7:
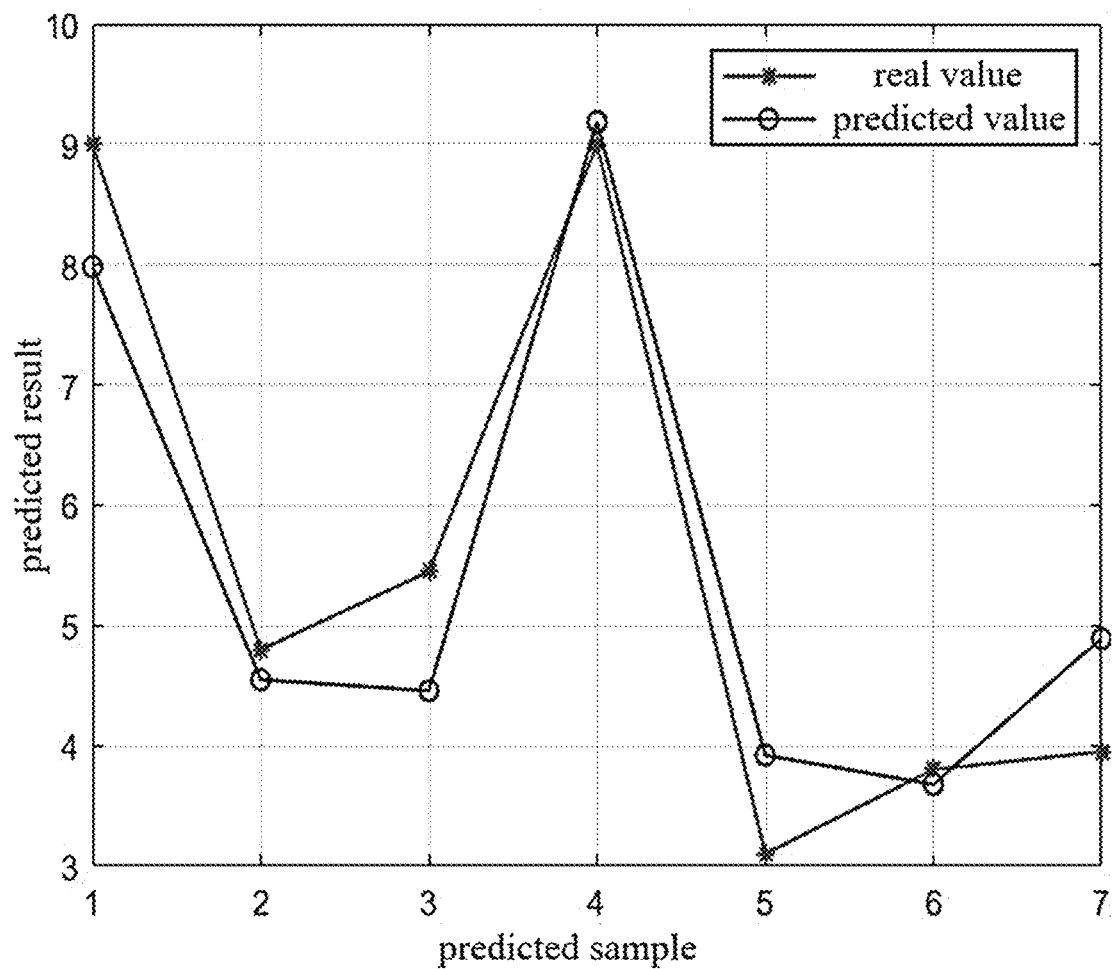
FIG. 7 illustrates a curve comparison diagram between predicted and simulated values of a maximum sidewall velocity in the validation set with the PSO-BP of the disclosure.
Figure 8:
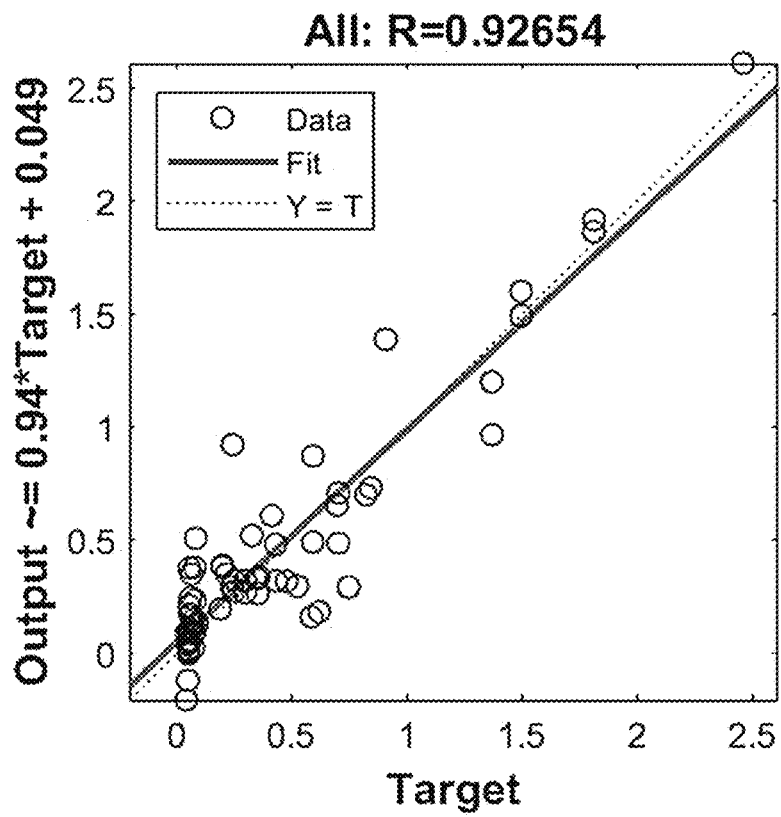
FIG. 8 illustrates a numerical fitting regression curve of the maximum sidewall displacement in the validation set with the PSO-BP of the disclosure.
Figure 9:
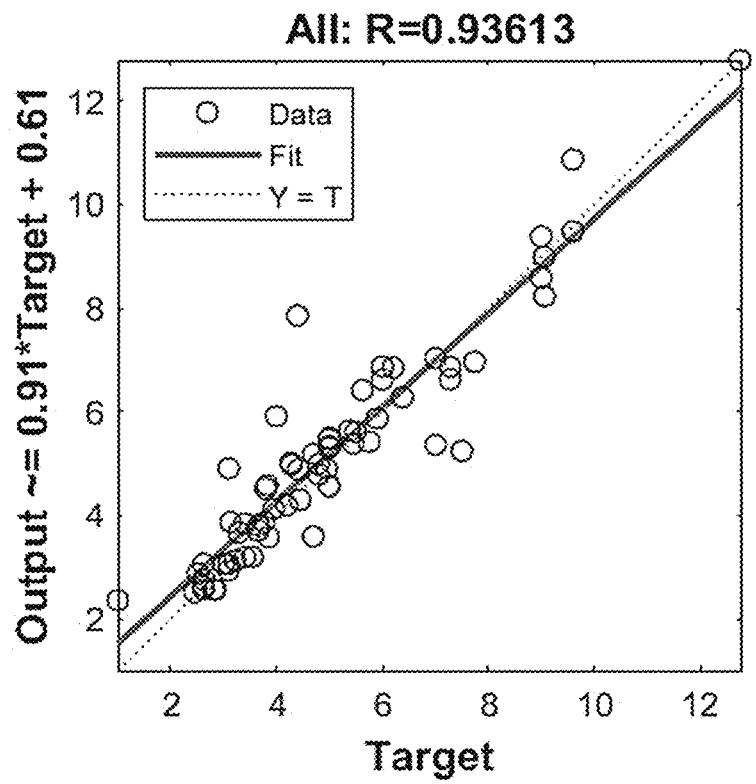
FIG. 9 illustrates a numerical fitting regression curve of the maximum sidewall velocity in the validation set with the PSO-BP of the disclosure.
Figure 10:
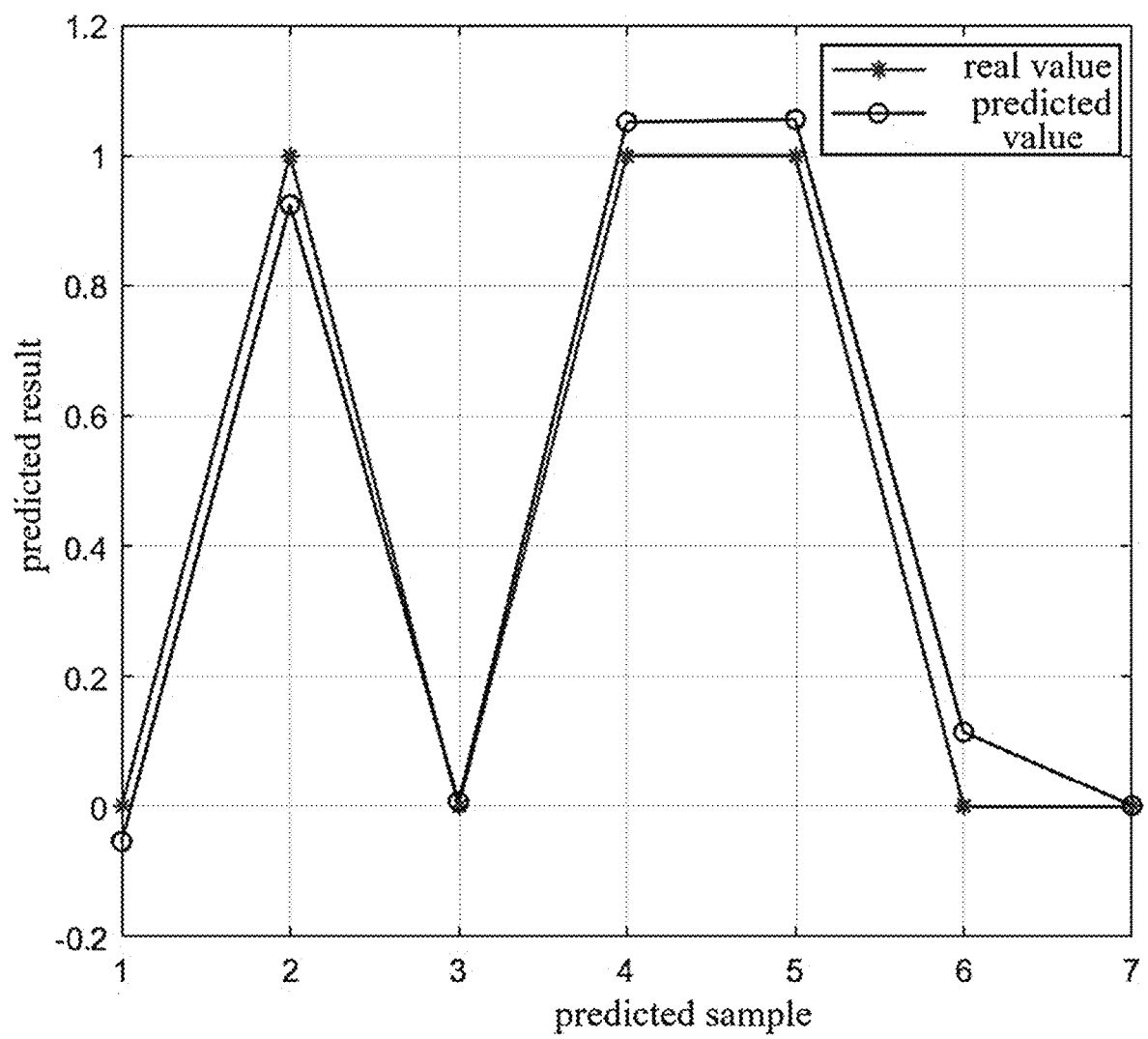
FIG. 10 illustrates a curve comparison diagram between predicted and simulated values in the validation set with a GA-SVM of the disclosure.

S442, in a GA-SVM model, the maximum sidewall displacement and the maximum sidewall velocity in the multiple datasets (i.e., the 66 groups of datasets in the embodiment) are used as assessment indicators, a result corresponding to whether the failure occurs in the roadway is used as a target value, with the result corresponding to whether the failure occurs in the roadway being quantified as 0 or 1 for prediction, the training set and the validation set are input into the GA-SVM model, and the preliminary roadway surrounding rock stability assessment model is refined by using a GA-SVM algorithm. Predicted values in the validation set are compared with the simulated values, as shown in FIG. 7. Compared with the actual failure conditions of the roadway in the numerical simulation, the predicted result shows a high accuracy rate, with the accuracy of the model reaching 100%.

Step 5: the optimized roadway surrounding rock stability assessment model is used to assess stability of other mining stages of the roadway to be assessed, and whether surrounding rock of the roadway to be assessed will become unstable or fail is determined under a target geological condition, a target support method, and a target pressure-relief measure when subjected to dynamic loads. The assessment results indicate that the roadway is stable and no instability or failure has occurred. Combined with the fact that no rockburst occurred in the roadway after a period of subsequent construction, it demonstrates that the stability assessment of the roadway surrounding rock by the disclosure is quite accurate.

In the step 5, the step that the optimized roadway surrounding rock stability assessment model is used to assess stability of other mining stages of the roadway to be assessed includes:

inputting specific parameters of the dynamic load intensity, the dynamic load action distance, the dynamic load action time, the static load stress level, the support parameter and the pressure-relief measure into the optimized roadway surrounding rock stability assessment model, and determining, by the optimized roadway surrounding rock stability assessment model, whether the surrounding rock of the roadway to be assessed will become unstable or fail under the specific parameters through data prediction.

The disclosure is based on the numerical simulation, the deep learning, and field measurement data. First, the impact of various influencing factors on the stability of the roadway surrounding rock, such as the dynamic load intensity, the dynamic load distance, the dynamic load action time, the static load stress level, the support parameter and the pressure-relief measure, is analyzed through the numerical simulation, the dynamic response characteristics of the roadway surrounding rock are recorded, and the stability of the roadway surrounding rock under different working conditions can be conveniently and comprehensively determined through the data prediction. Then, in the deep learning, based on results of the numerical simulation, a nonlinear relationship between the influencing factors and the dynamic response characteristics of the surrounding rock of the roadway is determined, thereby building an assessment model that allows for a quick assessment of the stability of the roadway surrounding rock. Finally, the assessment model is refined and perfected by using field data, which can significantly improve the accuracy of the assessment model.

The disclosure constructs an accurate, objective, rational, and reliable stability assessment model for the roadway surrounding rock, overcoming challenges of traditional assessment methods, which are labor-intensive, time-consuming, costly, and unable to conduct large-scale or comprehensive field measurements. The method has advantages of being accurate, objective, rational, and reliable in predicting the stability grade of the surrounding rock in mining roadways and assessing model maturity, with a high degree of consistency with actual conditions. The method aids in the scientific design of anti-impact support and support methods for roadways, effectively enhancing the anti-impact strength of the roadway surrounding rock, thereby significantly reducing the extent and scope of impact damage. The disclosure is of great significance for protecting the safety of personnel working in the mining space, improving operational safety, and ensuring the safe production of mines. The method is highly flexible and widely applicable, enabling multiple rapid and accurate assessments of the stability of the roadway surrounding rock under the same geological conditions while with different dynamic loads, support and pressure-relief measures. The method can also be adjusted and optimized according to actual conditions.

The above is only the illustrated embodiment of the disclosure. It should be pointed out that for those skilled in the art, several improvements and embellishments can be made without departing from the principles of the disclosure, and the improvements and embellishments should also be considered as the scope of protection of the disclosure.

What is claimed is:

1. A method for assessing stability of roadway surrounding rock based on numerical simulation and deep learning, comprising the following steps:

step 1: determining a roadway to be assessed in an underground coal mine, collecting rocks from a roof of the underground coal mine as samples, and performing physical and mechanical property tests on the samples with laboratory equipment to obtain actual stratum rock parameters under an actual geological environment;

step 2: establishing a two-dimensional geological model through the numerical simulation based on a drill core columnar diagram corresponding to drilling holes near the roadway to be assessed and the actual stratum rock parameters obtained from the physical and mechanical property tests;

step 3: changing influencing factors in the two-dimensional geological model, and then recording amounts of deformation of sidewalls of the roadway in the two-dimensional geological model, acceleration values of the deformation of the sidewalls of the roadway and whether failure occurs in the roadway to thereby obtain dynamic response characteristics of the roadway surrounding rock, taking the changed influencing factors and the dynamic response characteristics of the roadway surrounding rock as labels, combining the changed influencing factors and the dynamic response characteristics of the roadway surrounding rock to obtain a dataset, obtaining a plurality of datasets comprising the dataset, and forming a database with the plurality of datasets, wherein the influencing factors comprise a dynamic load intensity, a dynamic load action distance, a dynamic load action time, a static load stress level, a support parameter, and a pressure-relief measure;

step 4: dividing the plurality of datasets into a training set and a validation set according to a set ratio, inputting the training set into a particle swarm optimization (PSO)-back propagation (BP) neural network and a genetic algorithm (GA)-support vector machine (SVM) deep learning model for the deep learning to obtain a preliminary roadway surrounding rock stability assessment model based on the numerical simulation and the deep learning, and adjusting and validating the preliminary roadway surrounding rock stability assessment model using the validation set to obtain an optimized roadway surrounding rock stability assessment model; and step 5: using the optimized roadway surrounding rock stability assessment model to assess the stability of other mining stages of the roadway to be assessed, and determining whether the roadway surrounding rock to be assessed will become unstable or fail under a target geological condition, a target support method, and a target pressure-relief measure when subjected to dynamic loads.

2. The method for assessing the stability of the roadway surrounding rock based on the numerical simulation and the deep learning as claimed in claim 1, wherein in the step 1, the actual stratum rock parameters comprise: a density, a bulk modulus, a shear modulus, a friction angle, and a cohesive force.

3. The method for assessing the stability of the roadway surrounding rock based on the numerical simulation and the deep learning as claimed in claim 1, wherein in the step 2, a universal distinct element code (UDEC) numerical simulation software is used to establish the two-dimensional geological model.

4. The method for assessing the stability of the roadway surrounding rock based on the numerical simulation and the deep learning as claimed in claim 3, wherein in the step 2, establishing the two-dimensional geological model comprises the following steps:

S21: determining boundary conditions of the two-dimensional geological model, comprising: setting horizontal displacements in x and y directions to zero, fixing a lower boundary of the two-dimensional geological model by setting a displacement at the lower boundary to zero, and setting an upper boundary of the two-dimensional geological model as a free boundary subjected to equivalent loading; selecting a Mohr-Coulomb yield criterion; establishing the two-dimensional geological model based on the drill core columnar diagram with no considering plastic flow and dilatancy; and assigning the actual stratum rock parameters obtained in the step 1 to the two-dimensional geological model;

S22: applying loads to a top and two sides of the two-dimensional geological model according to an actual burial depth and crustal stress measurement results, wherein the load applied to the top of the two-dimensional geological model is a self-weight load, the self-weight load is calculated by using an equation (1), the loads applied to the two sides of the two-dimensional geological model are calculated based on the crustal stress measurement results, and calculation of the loads to the top and the two sides of the two-dimensional geological model is performed under given mechanical conditions and displacement boundary conditions to thereby make the two-dimensional geological model from an initial state to an initial stress equilibrium state, wherein the equation (1) is as follows:

$$P=\gamma H; \qquad (1)$$

where P represents the self-weight load, $\gamma$ represents an average unit weight of strata, with a value of 25 kilonewton per cubic meter ($kN/m^3$), and H represents a height from the upper boundary to a ground surface, with a unit being meters (m); and S23: using a crack command in the UDEC numerical simulation software to divide the two-dimensional geological model into five layers, wherein the five layers comprise four layers as the roof being siltstone, argillaceous siltstone, siltstone and mudstone, and a layer of coal seam, and the roadway is arranged within the coal seam.

5. The method for assessing the stability of the roadway surrounding rock based on the numerical simulation and the deep learning as claimed in claim 3, wherein in the step 3, obtaining the plurality of datasets comprising the dataset comprises:

arranging the roadway in the two-dimensional geological model, arranging measurement lines on the sidewalls of the roadway and a bottom of the roadway, monitoring the amounts of the deformation of the sidewalls of the roadway, the acceleration values of the deformation of the sidewalls of the roadway and whether the failure occurs in the roadway under one time of the changed influencing factors to thereby obtain the dynamic response characteristics of the roadway surrounding rock, taking the changed influencing factors and the dynamic response characteristics of the roadway surrounding rock as the labels, combining the changed influencing factors and the dynamic response characteristics of the roadway surrounding rock to obtain the dataset, establishing a plurality of numerical simulation models under different times of the changed influencing factors, and obtaining the plurality of datasets accordingly.

6. The method for assessing the stability of the roadway surrounding rock based on the numerical simulation and the deep learning as claimed in claim 5, wherein the step 4 comprises:

S41, shuffling randomly an order of the plurality of datasets in the database by using a Randperm function in a matrix laboratory (MATLAB) software, and then dividing the plurality of datasets into the training set and the validation set according to the set ratio of 7:3;

S42, establishing the PSO-BP neural network, comprising:

S421, determining a topology structure and a number of nodes of a BP neural network;

S422, setting initial parameters of a PSO algorithm, and optimizing initial weights and thresholds of the BP neural network, wherein the initial parameters comprise: learning factors, a number of training iterations, a target error, a learning rate, a population update frequency, a population size, and position and velocity limits of particles;

S423, determining a root mean square error (RMSE) function as a performance evaluation function of the BP neural network;

S424, determining an individual optimal solution and a global optimal solution in the PSO algorithm;

S425, updating each of the particles according to an equation (2) as follows:

$$\begin{cases} v_d^{j+1} = v_d^j + c_1 \times rand() \times (pbest_d^i - x_d^i) + c_2 \times rand() \times (gbest_d^i - x_d^i) \\ x_d^{j+1} = x_d^j + v_d^{j+1} \end{cases} \quad (2)$$

where i=1, 2 to N, N represents a total number of the particles, $v_d^i$ represents a velocity vector of a particle i of the particles in dimension d, rand( ) represents a random number between 0 and 1, $x_d^i$ represents a position vector of the particle i of the particles in the dimension d, $pbest_d^i$ represents a personal best solution of the particle i of the particles in the dimension d, $gbest_d^i$ represents a global best solution of the particle i of the particles in the dimension d, and $c_1$ and $c_2$ are learning factors, with $c_1=c_2=2$;

S426, when a number of iterations in the PSO algorithm reaches the number of training iterations or the target error is met, ending an iterative optimization process of the PSO algorithm; when the number of iterations in the PSO algorithm does not reach the number of training iterations and the target error is not met, returning to the step S423 for further optimization;

S427, substituting optimized weights and optimized thresholds obtained at the ending the iterative optimization process of the PSO algorithm as optimal output values into the BP neural network for data training to achieve effective, accurate, and rapid data fitting;

S43, establishing the GA-SVM deep learning model, comprising:

S431, setting initial parameters of an SVM, comprising a kernel function K (x, z) and an appropriate penalty parameter C;

S432, setting initial parameters of a GA, and optimizing the initial parameters of the SVM;

S433, determining the RMSE function as an evaluation function of the SVM;

S434, when a number of iterations in the GA reaches a preset number of training iterations or a preset target error is met, ending an iterative optimization process of the GA; when the number of iterations in the GA does not reach the preset number of training iterations and the preset target error is not met, returning to the step S432 for further optimization;

S435, substituting optimized parameters c and g obtained at the ending the iterative optimization process of the GA as optimal output values of the GA into the SVM for data training to achieve the effective, accurate, and rapid data fitting;

S44, establishing the preliminary roadway surrounding rock stability assessment model, comprising:

S441, in a PSO-BP neural network model, using a vertical stress, a horizontal stress, the dynamic load intensity, the dynamic load distance, a sidewall bolt length, a base corner bolt length, and a base corner bolt angle in the plurality of datasets as assessment indicators, using a maximum sidewall displacement and a maximum sidewall velocity in the plurality of datasets as target values, inputting the training set and the validation set into the PSO-BP neural network model, and refining the preliminary roadway surrounding rock stability assessment model by using a PSO-BP algorithm; and S442, in a GA-SVM model, using the maximum sidewall displacement and the maximum sidewall velocity in the plurality of datasets as the assessment indicators, using a result corresponding to whether the failure occurs in the roadway as a target value, inputting the training set and the validation set into the GA-SVM model, and refining the preliminary roadway surrounding rock stability assessment model by using a GA-SVM algorithm.

7. The method for assessing the stability of the roadway surrounding rock based on the numerical simulation and the deep learning as claimed in claim 5, wherein in the step 5, using the optimized roadway surrounding rock stability assessment model to assess the stability of the other mining stages of the roadway to be assessed comprises:

inputting specific parameters of the dynamic load intensity, the dynamic load action distance, the dynamic load action time, the static load stress level, the support parameter and the pressure-relief measure into the optimized roadway surrounding rock stability assessment model, and determining, by the optimized roadway surrounding rock stability assessment model, whether the roadway surrounding rock to be assessed will become unstable or fail under the specific parameters through data prediction.

* * * * *